United States Patent

Ford

Patent Number: 6,110,313
Date of Patent: *Aug. 29, 2000

[54] METHOD FOR HEAT FORMING SOLID SURFACE VENEER

[75] Inventor: Trevor Ford, Peakhurst, Australia

[73] Assignee: Norford Industries Pty Limited, Australia

[*] Notice: This patent issued on a continued prosecution application filed under 37 CFR 1.53(d), and is subject to the twenty year patent term provisions of 35 U.S.C. 154(a)(2).

[21] Appl. No.: 08/824,273

[22] Filed: Mar. 26, 1997

[30] Foreign Application Priority Data

Mar. 27, 1996 [AU] Australia .................................. PN8979

[51] Int. Cl.⁷ ....................................................... B32B 31/20
[52] U.S. Cl. ........................... 156/212; 156/285; 156/322; 312/140.3
[58] Field of Search .................................... 264/553, 554, 264/571, 299, 322, 550, 295; 156/245, 285, 212, 286, 322, 216, 382, 479, 480, 493, 499, 583.3; 312/140.3

[56] References Cited

U.S. PATENT DOCUMENTS

| | | |
|---|---|---|
| 3,153,813 | 10/1964 | Swick . |
| 3,156,012 | 11/1964 | Hritz . |
| 3,273,203 | 9/1966 | Ross . |
| 3,319,295 | 5/1967 | Jones-Hinton et al. . |
| 3,382,124 | 5/1968 | Briskey .................................. 156/212 |
| 3,466,706 | 9/1969 | Asano . |
| 3,649,152 | 3/1972 | Knack, Sr. . |
| 3,728,799 | 4/1973 | Streltsov . |
| 3,794,458 | 2/1974 | Iwasaki . |
| 3,887,321 | 6/1975 | Hijikata et al. . |
| 3,997,286 | 12/1976 | Gabrys . |
| 4,147,486 | 4/1979 | Jahnle . |

(List continued on next page.)

FOREIGN PATENT DOCUMENTS

| | | |
|---|---|---|
| 19227/67 | 9/1967 | Australia . |
| 38358/68 | 12/1969 | Australia . |
| 76263/87 | 1/1988 | Australia . |
| 78638/87 | 6/1988 | Australia . |

(List continued on next page.)

OTHER PUBLICATIONS

MEMBRANO brochure, Mercury Vacuum Presses, Inc.
Mercury Vacuum Presses, Inc. literature re: The Top Frame Press Model TF, 2 pages.

(List continued on next page.)

*Primary Examiner*—Michael W. Ball
*Assistant Examiner*—Michael A. Tolin
*Attorney, Agent, or Firm*—McGlew and Tuttle, P.C.

[57] ABSTRACT

A method is provided for forming a curve or curves in a thin solid surface material such as an acrylic sheet material. The method includes taking a sheet of solid surface material of a thickness within the range of 1.4 mm to 5.9 mm and placing the sheet in or on an apparatus which includes a heating station a platen or platens and a vacuuming station including a sandwich mold. The heating platens are set at a predetermined temperature within the range 80° C. to 200° C. and the solid surface material to be formed is brought into contact with or at least near the heating platens so that heat emanating from said platen/s is distributed substantially uniformly across at least one surface of the solid surface material. The heating of the solid surface material is for a predetermined time within the range of 5 seconds–10.0 minutes according to the temperature selected from the temperature range. The heated solid surface material sheet is transferred into or onto the vacuum mold prior to cooling, causing with the use of said sandwich mold, based on mold parts or a substrate used as a mold part, the solid surface material to bend about said mold generally along a corridor located at a predetermined distance from an edge of the sheet and/or in a region therebetween to form a bend or bends having a radius or radii of a predetermined sizes.

16 Claims, 5 Drawing Sheets

U.S. PATENT DOCUMENTS

| | | | |
|---|---|---|---|
| 4,217,157 | 8/1980 | Stoltze et al. . | |
| 4,234,373 | 11/1980 | Reavill et al. . | |
| 4,417,864 | 11/1983 | Shigeo et al. . | |
| 4,447,282 | 5/1984 | Valerio et al. | 156/216 |
| 4,740,342 | 4/1988 | Menard et al. . | |
| 4,824,704 | 4/1989 | Suga et al. | 428/36.92 |
| 4,966,546 | 10/1990 | Wu | 432/121 |
| 5,015,167 | 5/1991 | Charles | 425/388 |
| 5,051,083 | 9/1991 | Coluzzi . | |
| 5,236,658 | 8/1993 | Ford . | |
| 5,418,048 | 5/1995 | Daff et al. | 428/213 |
| 5,521,243 | 5/1996 | Minghetti et al. | 524/437 |
| 5,572,804 | 11/1996 | Skaja et al. | 36/29 |
| 5,614,145 | 3/1997 | O'Kane | 264/553 |
| 5,851,606 | 12/1998 | Visser | 428/15 |

FOREIGN PATENT DOCUMENTS

| | | |
|---|---|---|
| 59-201815 | 11/1984 | Japan . |
| 206900 | 11/1987 | New Zealand . |
| 1343304 | 1/1974 | United Kingdom . |
| 2101927A | 1/1983 | United Kingdom . |
| 2102330A | 2/1983 | United Kingdom . |

OTHER PUBLICATIONS

Mercury Vacuum Presses, Inc. literature re: MEMBRANO Model CP, one page.

Mercury Vacuum Presses, Inc. literature re: MEMBANO Model XP, 2 pages.

Mercury Vacuum Presses, Inc. literature re: Manual Vacuum generator Models VG2/VG4, 2 pages.

Mercury Vacuum Presses, Inc. literature re: Mercury Vacuum Pump Models MVP 50/MVP 100,2 pages.

Mercury Vacuum Presses, Inc. 1997 Price List, Effective Mar. 1998, 2 pages.

Mercury Vacuum Presses, Inc. literature entitled Philosophy, 2 pages.

Mercury Vacuum Presses, Inc. literature re: Fine Furniture and Cabinetmakers, 4 pages.

METHOD FOR HEAT FORMING SOLID SURFACE VENEER

FIELD OF THE INVENTION

The present invention relate to a process for heat bending thin sheet materials and in particular solid surface materials such as methyl methacrylate and copolymers thereof. More particularly, the invention relates to a method of heat forming by a process commonly known as thermoforming such thin sheet materials for use alone or in apposition with a substrate.

BACKGROUND OF THE INVENTION

Introducing a profile such as a curve or bend to a solid surface material is generally carried out according to two techniques, the first being post forming and the second thermoforming. The former method relates to the use of heat applied locally to a solid surface material to enable a curve or bend to be introduced. After a localised area which may be a region at or near the edge of a sheet is heated it is then physically bent by a press or sandwich mould before it cools. Although this technique has met with some success when used with some solid surface materials, it has been found that when acrylics are bent in this way, serious problems occur in the material such as crazing, cracking, blanching and lowering of impact resistance. In the worse case, acrylic solid surface veneer material curved by post forming can simply break away in the region of the bend. This renders the finish in the material commercially unacceptable.

Thermoforming is a term generally applied to the process of heat forming solid surface materials whereby heat is fully distributed over the whole surface area of the material even though bending is to take place in a relatively localised area of the sheet. One example of this process is that embodied in the applicant's own U.S. Pat. No. 5,236,658 which relates to a process and apparatus for heat forming of materials which have a thickness within or near the range of 8–20 mm. This patent is directed to the heat formation of solid surface materials such as Corian generically referred to as methyl methacrylate. Solid surface materials are by nature brittle and do not behave well under bending stresses. They nevertheless have high impact resistance and are very durable in such applications as kitchen bench tops and wall claddings. It is desirable for solid surface materials to be applied and finished without joins and with smoothly radiused curves. The technique involved in bending Corian in the manner described in U.S. Pat. No. 5,236,658 provides these curves and eliminates joins but this patent is specifically directed to the bending of thick sheets of thickness close to or between the range 8 mm and 20 mm which range is regarded in the industry as thick. Up until now, the industry has experienced significant problems in bending thinner but brittle materials such as solid surface veneer (acrylic) material for the reasons indicated above with reference to post forming.

According to the prior art techniques, attempts were made to bend thin solid surface veneer material but these produced poor results. Post forming was tried followed by thermoforming.

In the latter method, the thin solid surface veneer was heated in an oven using heating elements spaced apart from the surface of the sheets but it cracked at the bends which were formed in the material subsequent to heating. The material also suffered from blanching and blistering rendering this method of forming solid surface veneer unacceptable, to find a method which would produce commercially acceptable product. Thus, up until now it was not thought possible to bend thin solid surface material free of the defects previously experienced.

The inventor found that instead of an oven, if heating platens were placed in contact with or a short distance from thin solid surface material and the material then heated according to a predetermined time temperature regime, solid surface veneer could be formed with curves of a given radius without the problems of cracking, blanching, blistering, and reduction in impact resistance. The optimum time/temperature relationships were arrived at after trials and experimentation.

SUMMARY OF THE INVENTION

The present invention seeks to overcome the problems associated with bending thin solid surface materials such as acrylics such that they are rendered acceptable to the consumer market. Radiused curves in the thin acrylic materials have been achieved in the past by post forming and thermoforming with poor quality and indeed commercially unacceptable results. It is now possible as a result of the methodology to be described below to successfully thermoform thin solid surface veneer absent the prior art problems In one broad form the invention comprises:
a method for forming a curve or curves in a thin solid surface material such as an acrylic sheet material comprising the steps of:
 a) taking a sheet of solid surface material of a thickness within the range of 1.4 mm to 5.9 mm;
 b) placing the sheet in or on an apparatus which includes a heating station comprising a platen or platens and a vacuuming station including a sandwich mould,
 c) setting the heating platen/s at a predetermined temperature within the range 80° C. to 200° C.;
 d) bringing the solid surface material to be formed into contact with or at least near the heating platen/s so that heat emanating from said platen/s is distributed substantially uniformly across at least one surface of the solid surface material;
 e) heating the solid surface material for a predetermined time within the range 5 seconds–10 minutes according to the temperature selected from the temperature range;
 f) transferring the heated solid surface material into or onto the vacuum mould forming station;
 g) prior to cooling, causing with the use of said sandwich mould the solid surface material to bend about said mould generally along a corridor located at or at predetermined distance from an edge of the sheet and/or in a region therebetween to form a bend or bends having a radius or radii of a predetermined sizes.

In another broad form the invention comprises:
a method for forming a curve or curves in a thin solid surface material such as an acrylic sheet material comprising the steps of:
 a) taking a sheet of solid surface material of a thickness within the range of 1.4 mm to 5.9 mm;
 b) taking an apparatus which includes a heating station comprising a platen or platens and a moulding station comprising a sandwich mould;
 c) setting the heating platen/s at a predetermined temperature within the range 80° C. to 200° C.;
 d) bringing the solid surface material to be formed into contact with or at least near the heating platen/s so that heat emanating from said platen/s is distributed substantially uniformly across at least one surface of the solid surface material;

e) heating the solid surface material for a predetermined period within the range 5 seconds–10 minutes according to the temperature selected from said temperature range;

f) transferring the heated solid surface material from the heating station to the mould forming station;

g) prior to cooling, causing with the use of the sandwich mould the solid surface material to bend about said mould generally along a corridor located at or at predetermined distance from an edge of the sheet and/or in a region therebetween to form a bend or bends having a radius or radii of a predetermined size/s.

According to a preferred embodiment the heating is applied to an acrylic material over its whole surface causing the heat to penetrate through the full thickness of the material rendering at sufficiently plastic. This enables the sheet to bend evenly through the whole thickness of the material without compromise to the molecular and hence structural integrity of the sheet once formed according to the predetermined radiused curve or curves. It is preferable that the acrylic sheet is brought into contact with or in very close apposition to the heating platen as soon as the platen has reached the predetermined temperature. The heating may be provided by means of heating elements within the platens. It is essential that the platens distribute the heating evenly throughout the sheet.

In another broad form the present invention comprises: a method for forming a curve or curves in a solid surface material such as an acrylic sheet comprising the steps of:

a) taking a sheet of solid surface material of a thickness within the range of 1.4 mm to 5.9 mm.

b) applying an adhesive to one side of the sheet;

c) taking a sheet of a solid material such as timber particle board to provide a substrate;

d) applying adhesive to a surface of the solid surface substrate which will receive said sheet;

e) bringing the surfaces of the solid surface material and solid substrate material to which adhesive has been applied into contact with each other such that at least part of the surface of the solid surface material adheres to at least part of an opposing sure of the substrate to form a solid surface composite;

f) introducing the composite into or onto an apparatus which includes a heating station and a mould forming station;

g) setting the heating station which includes a heating platen/s at a predetermined temperature within the range 80° C. to 200° C., h) placing the solid surface material for a predetermined time in contact with or near the heat platen/s so that heat emanating from said heat source is distributed substantially uniformly throughout at least one side of the sheet and through the full thickness of the solid surface material;

i) heating the solid surface material for a predetermined period within the range 5 seconds–10 minutes.

j) prior to cooling of the solid surface material introducing the composite onto or into a mould forming station including a sealed envelope thereabout;

k) applying a vacuum to the inside of said envelope to enable a predetermined length or width of said solid surface material to conform to the contour of at least one edge of said solid material substrate such that the sheet wraps around at least one corresponding edge of the substrate to form at least one radiused curve.

In another form the present invention comprises: a method for forming a curve or curves in a solid surface material and applying the so formed material to a substrate; the method comprising the steps of:

a) preparing a solid substrate material to receive a sheet of solid surface material of a thickness within the range 1.4 to 5.9 min;

b) placing the solid substrate on a forming mould located in or on a forming apparatus including a heating station including heating platens and a vacuuming forming station including a mould and a sealing envelope thereabout;

c) placing the solid surface material in contact with a heating platen or very near to the platen and heating the platen to a predetermined temperature for a predetermined period so that heat emanating from said platen is distributed substantially uniformly over at least one side of the sheet and throughout the full thickness of the sheet;

d) after the predetermined heating period has expired relocating the solid surface material onto said solid substrate;

e) before cooling sandwiching the solid surface material between an upper mould element and said substrate such that the solid surface material conforms to the profile of an opposing surface of the substrate.

Preferably, the method comprises the additional step of sealing the mould station with the sealed envelope and applying a vacuum to the inside of the envelope such that a free end or edges of the solid surface material conform to the profile of a corresponding free end or edges surface of the solid substrate.

The bending of the sheet material alone or in conjunction with a hard board substrate to form a composite is effected according to a preferred time/temperature regime. A suitable apparatus for employing the methodology of the present invention is that described in the applicant's own U.S. Pat. No. 5,236,658. The heating takes place in a heating station wherein platens or other suitable heating means are preheated to a predetermined temperature following which the acrylic material is introduced onto or into the heating station. The material is then left at the station for a predetermined period following which the material is shifted to a moulding station wherein a vacuum is applied causing a bend in the material with a radius as low as 6 mm. According to one embodiment the heating temperature is set at 170° C. with the timer set at 2.2 minutes. According to one embodiment the acrylic and substrate are pressed together so that heating platens sandwich the so formed composite and mould the solid surface material to the preformed contour of an opposing surface of the substrate.

When a vacuum is applied overhanging free end solid surface veneer will form around the shaped substrate. The vacuum is held for 2 minutes then released.

BRIEF DESCRIPTION OF THE DRAWINGS

The present invention will now be described in more detail with reference to preferred but non limiting embodiments and with reference to the accompanying drawings wherein.

DETAILED DESCRIPTION OF THE PREFERRED EMBODIMENTS

Figure 1:
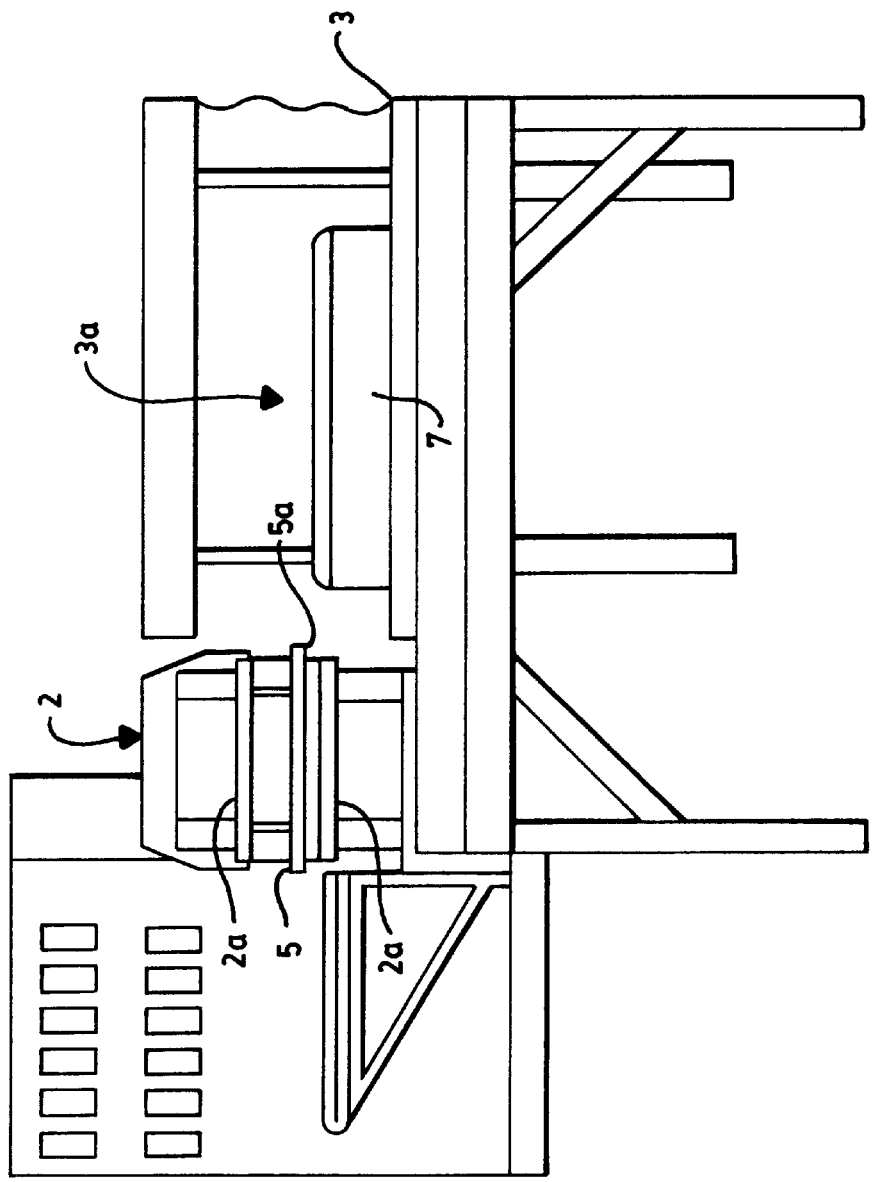
FIG. 1: shows an isometric view of a suitable apparatus including a heating station with a composite of an acrylic sheet and substrate thereon according to one embodiment.
Figure 2:
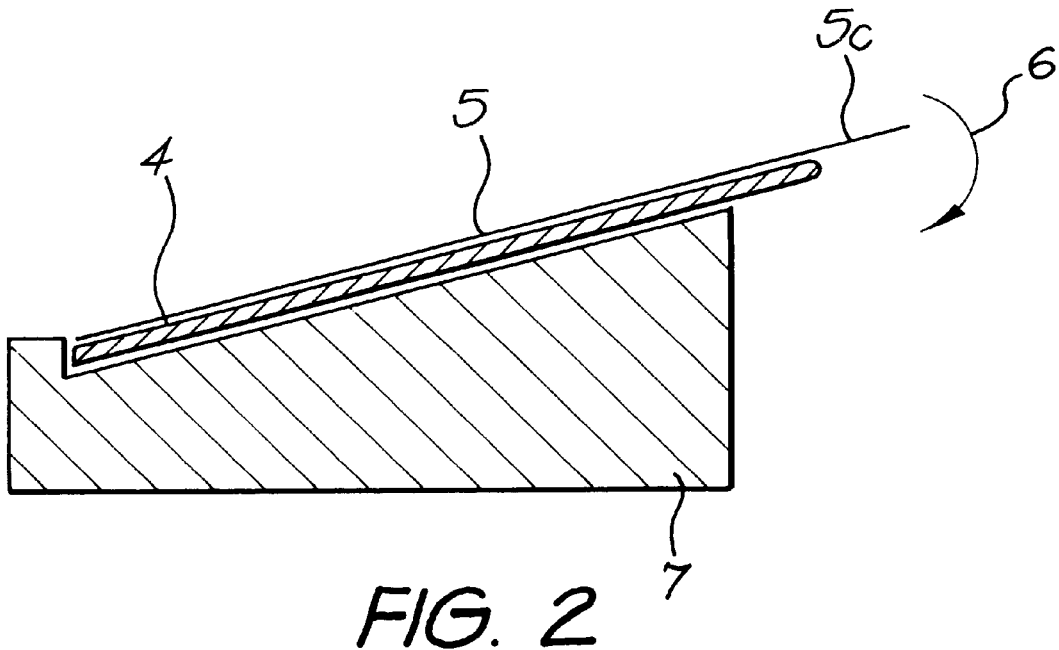
FIG. 2: shows a cross sectional view of a base mould having thereon a solid surface veneer sheet prior to bending of the solid surface material.
Figure 3:
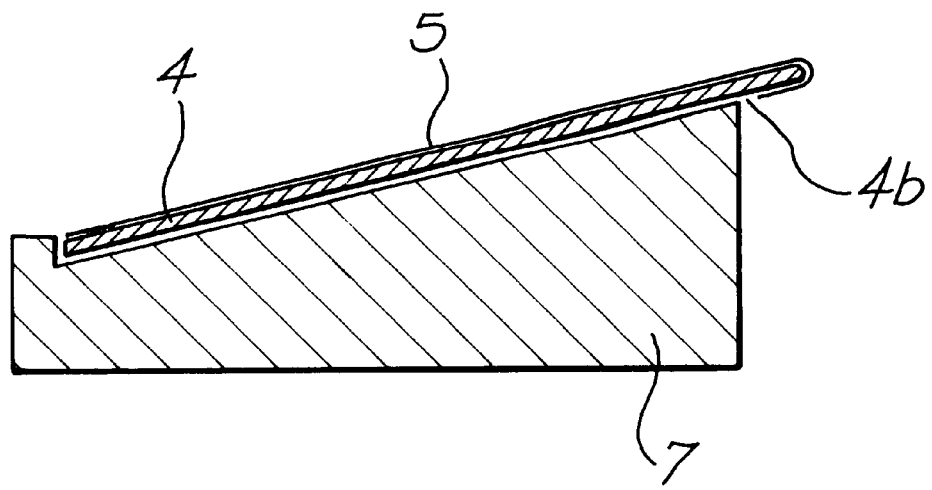
FIG. 3: shows a cross sectional view of the base mould of FIG. 2 this time after bending of the solid surface material.

A number of embodiments of the invention will now be described. Referring to FIG. 1 there is shown an apparatus 1 which is suitable for use in thermoforming of an acrylic composite. Apparatus 1 comprises a heating station 2 including heating platens 2a which enable even distribution of heat over the full surface of the acrylic material to be formed. The invention will be described according to an embodiment wherein an acrylic sheet material is adhered to a particle board backing forming a substrate wherein an edge of the acrylic sheet is moulded to conform to an edge of the solid particle board substrate. Apparatus 1 has a platform 3 which includes a mould forming station 3a including a base mould 7 on which receives either solid surface material to be formed alone or a particle board substrate material 4 overlaid with an acrylic solid surface veneer 5 (see FIG. 2 also). Prior to placing the so formed composite on platform 3 an adhesive which is preferably heat reactive (although non heat reactive adhesives can be used), is applied to underside surface 5a of the acrylic matra and upper surface 4a of the substrate. Once the acrylic solid surface veneer is put into apposition with the particle board substrate it is then placed on platform 3 in preparation for heat treatment. One of the distinguishing features of the present invention is the nature of the heating in that platen 2 facilitates heat distribution throughout the whole of the surface area of veneer sheet 5. According to the prior art methodology and in particular post forming, heating took place in a localised area of the sheet prior to bending. As previously indicated, this caused such as defects as crazing, blanching and in severe cases cracking. Heating of the acrylic solid surface of veneer throughout its full thickness and over its full surface area eliminates a pronounced heat gradient which may contribute to crazing, blanching and cracking in the region of bending. The optimum temperature for heating the solid surface veneer 5 is 170° C. This temperature is maintained for preferably 2.5 minutes. It has been found in trials that heating the solid surface veneer at a temperature of 170° C. for 2.5 minutes is the optimum combination of parameters which provides radiused curves free of prior art defects. However, it is possible to bend the solid surface veneer sheet 5 avoiding the above mentioned problems at adjusted temperatures and time periods but temperature values within the range 80° C. and 220° C. should be used. A variety of temperatures within this range may be feasible but as the temperature is increased above 170° C. the time the solid surface veneer is in the heating station must be reduced. Consequently where the temperature is decreased the heating time should be increased. The shorter the time the more impractical it is to handle the material and successfully complete the bending operation prior to cooling of the sheet. Due to the thinness of veneer sheet 5, it is necessary to heat the material from one side only as the applied heating is sufficient to penetrate the fill thickness of the material and render the sheet workable. Preferably, the thickness of the material would fall within the range 1.4 to 5.9 millimeters but an ideal thickness would be in the order of 3 mm. Once the solid surface veneer material is heated to the desired temperature and for the required period of time, cantilevered edge 5c begins to droop in the direction of arrow 6. FIG. 2 shows a mould forming station wherein the composite formed by particle board substrate 4 and solid surface veneer sheet 5 is placed for the moulding step. Preferably, base mould 7 onto which the composite is placed is located in a vacuum forming station such that a sealed envelope envelopes the vacuum forming station. During the heating phase, cantilevered edge 5c is supported by a support block (not shown) to prevent unwanted drooping. According to the preferred embodiment, platen 2 applies heat at 170° C. to acrylic surface 5 for preferably 2.5 minutes. When the composite is moved onto the forming platform machine in FIG. 2, cantilevered edge 5c of solid surface veneer 5 engages underside surface 4b of substrate 4 as shown in FIG. 3. This creates a radiused curved edge on the thin sheet acrylic material. For example, external radii of down to 6 mm can be achieved an internal radii of down to 34 mm are achievable. Radii above these values are likewise achievable.

According to an alternative embodiment acrylic solid surface veneer can also be thermoformed in the absence of a substrate. In this case the sheet is introduced into the heating station following which it is heated to the desired temperature. It is then transferred to a moulding station where the sheet is curved about a preformed mould such that the sheet assumes at least part of the contour of the mould.

Figure 3A:
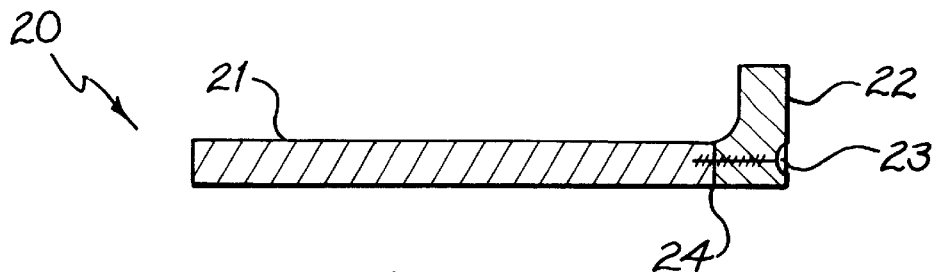
FIG. 3(a): shows a cross sectional elevation of a solid substrate back splash assembly according to one embodiment.
Figure 3B:
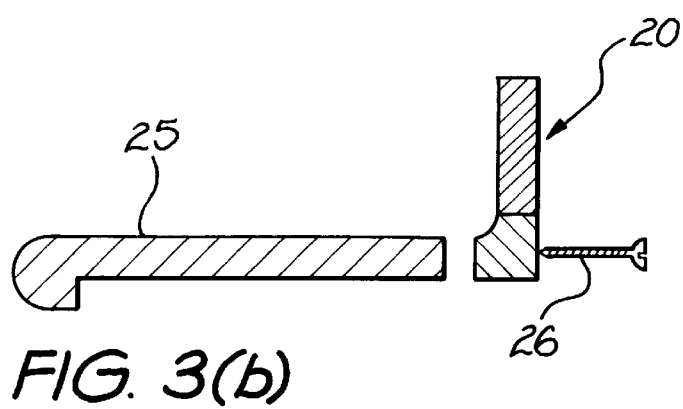
FIG. 3(b): shows a cross sectional elevation of a substrate comprising a bench and back splash assembly.

The present invention will now be described according to an alternative embodiment with reference to a method of application of a preformed solid surface material to a pre configured solid substrate. Referring to FIG. 3(a) there is shown a cross sectional elevation of a solid substrate back splash 20 according to one embodiment. The backsplash comprises backing element 21 and junction element 22 which is fixed to element 21 by means of screw 23 and optionally gluing in the region of joint 24. FIG. 3(b) shows an exploded view of a the backsplash assembly 20 and profile bench top 25 which are fitted together by means of screw 26 in order to form a solid substrate on which a pre heated solid surface material will be placed to conform to the contours of the substrate.

Figure 4A:
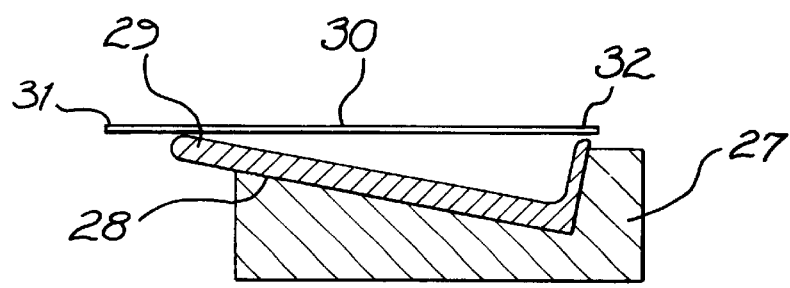
FIG. 4(a): shows the assembly of FIG. 3(b) located on a base mould.

FIG. 4(a) shows a mould element 27 which forms a base portion of a mould which will assist in formation of the solid surface material. Mould element 27 includes surface 29 on which is placed a solid substrate 29 similar to that described in FIGS. 3(a) and 3(b) above. Once he substrate has been placed on surface 28 it is prepared for receiving the solid surface material. Preparation involves removal of dust particles, manually or by use of compressed air. Solid surface material 30 is shown placed over the substrate 29 with sufficient length at free ends 31 and 32 allowed to enable the solid surface material to fully conform to the surface of the substrate which is to be covered by the solid surface veneer. Prior to placing solid surface veneer 30 over substrate 29, the solid surface material 30, is placed on a heating platen or platens which are preheated to a predetermined temperature preferably falling within the range 165° C. to 185° C. for a predetermined time period which will optimally fall within the range 1.5 minutes to 3 minutes. The temperatures selected will dictate the length of time that the solid surface material is left on the platen such that if a lower temperature is selected, the solid surface material will be required to remain on the platen for a longer period until the requisite plasticity of the material is achieved to enable it to eventually conform to the shape of the substrate on which it will be placed. If on the other hand the temperature is increased, the solid surface material can be left on the platen for a shortened period. Where the solid surface material is denser, the heating time will be longer. Usually, solid surface materials with a speckled finish have a higher density than plain colours necessitating higher temperatures and/or longer time periods. Once the solid surface material is heated to the required temperature it is removed from the heating station to the forming station which has already been prepared in accordance with the arrangement in FIG. 4(a).

Figure 4B:
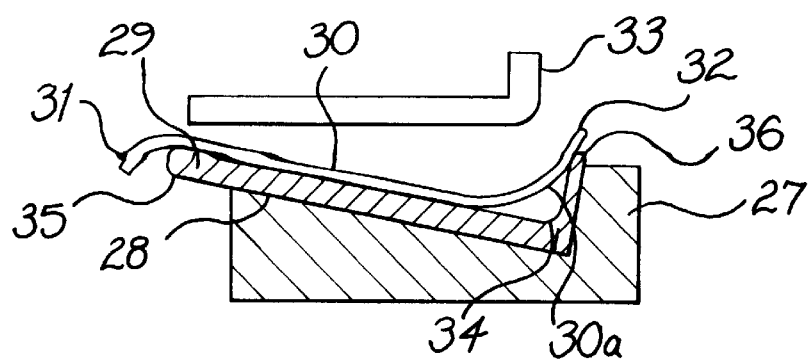
FIG. 4(b): shows the arrangement of FIG. 4(a) but including an upper forming mould opposing a sheet of solid surface material prior to formation thereof.

FIG. 4(b) shows the arrangement of FIG. 4(a) this time including upper forming mould 33 which opposes solid surface material 30. Before solid surface material 30 has cooled, upper forming mould 33 is brought into contact with the opposing surface of material 30 in order to physically conform region 30a to contour 34 of substrate 29. Thus, the finished radius of the internal corner 30a of solid surface material 30 will be predetermined by the contour of region 34. This step is taken whilst the solid surface material still has sufficient heat for plastic deformation.

Following this step, the assembly shown in FIG. 4(b) is placed in a vacuum mould. This is effected by use of an envelope included in the forming station. When under vacuum, free end 31 of material 30 conforms to the contour 35 of substrate 29. Likewise, free end 32 conforms to the shape of opposing profile 36 of substrate 29. When the solid surface material has cooled, it now assumes the profile of the substrate to which it will ultimately be attached.

Figure 5A:
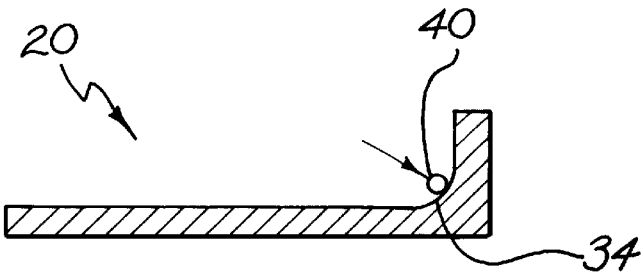
FIG. 5(a): shows the back splash of FIG. 3(a) prepared with a silicon bead.
Figure 5B:
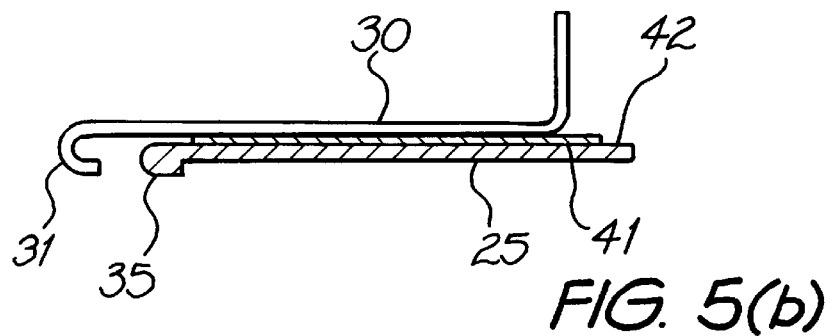
FIG. 5(b): shows a bench substrate receiving the preformed solid surface material.
Figure 5C:
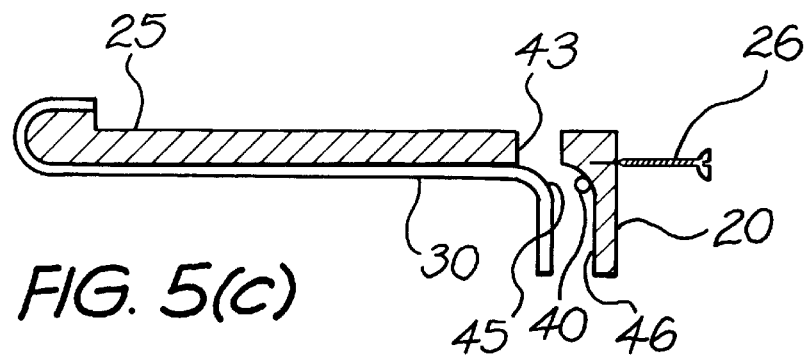
FIG. 5(c): shows the backsplash and bench assembly receiving the preformed solid surface veneer.

The method of fixation of the formed solid surface material to the profiled substrate can be shown in FIGS. 5(a)–5(c). Referring to FIG. 5(a) a silicon bead 40 is applied to or in the region of surface 34 of backsplash assembly 20, As can be seen from FIG. 5(b) an adhesive bed 41 is applied to upper surface 42 of member 25 The now formed solid surface material 30 is laid in contact with adhesive bed 41 following which it is slid into position such that free end 31 which is now formed as a contour which corresponds to end 35 of member 25 is slid into engagement with it.

The final step in assembly of the bench top described can be seen from FIG. 5(c) with the final step comprising the attachment of backsplash assembly 20 to end 43 of member 25. This fixation is effected by means of screw 26 (according to the arrangement shown in FIG. 3(b). When backsplash assembly 20 is affixed as described, silicon bead 40 will be squeezed between external surface 45 and internal surface 46 of backsplash 20. Once these steps are performed the bench top is ready for installation and the substrate is effectively waterproofed. Once the solid surface veneer described in FIGS. 3(a) to 5(c) has been bonded and the backsplash assembly 20 fixed into position, the completed assembly is returned to the mould in the vacuum table. The upper forming mould is again introduced to the top of the solid surface material whereupon the environment is subjected to an additional vacuum of about 10 minutes. As an example of manufacturing parameters the total fabrication time for a 3.6 meter length of solid surface material with 180° bull nose edge and a 100 mm backsplash will be in the order of 30 minutes. Additional time may be required for such activities as preparing the substrate.

Figure 6:
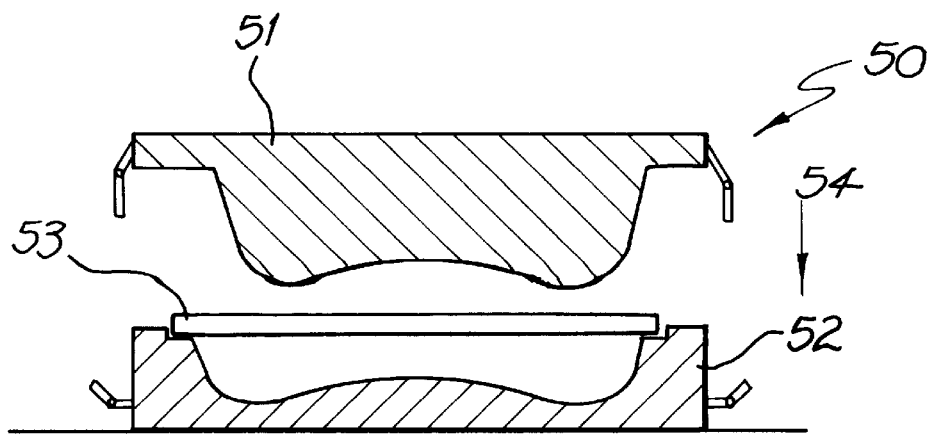
FIG. 6: shows a mould assembly according to one embodiment used in the method of the present invention to form a profiled seat.

As an alternative to above described method, it is possible to form a solid surface material in an appropriate mould according to a predetermined contour and without the need to apply the solid surface material to a supporting substrate. Referring to FIG. 6 there is shown a mould assembly 50 comprising corresponding male and female mould profile parts in opposing relationship. Located therebetween is a sheet of preheated thin solid surface material which will assume the contour of the profile of the male and female mould profile parts 52 when female mould part is brought into engagement with male mould profile part 51 in the direction of arrow 54. Once the solid surface material 53 is cooled, the so formed profiled material can be used for its predesignated application such as a seat top or the like.

Figure 7A:
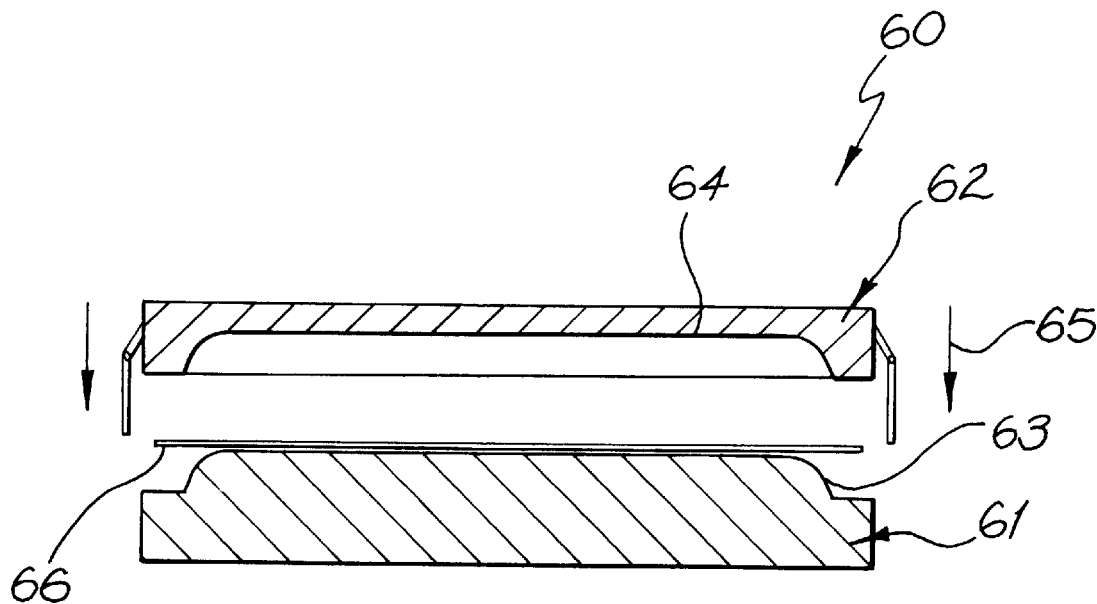
FIG. 7(a): shows a mould assembly used in the method of the present invention to form a profiled table top.
Figure 7B:
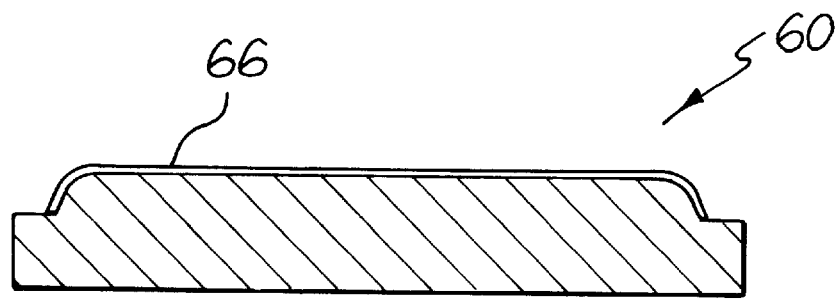
FIG. 7(b): shows the assembly of FIG. 7(a) with the solid surface material conformed to the profile of the bottom mould.

FIG. 7(a) shows a conceptually similar arrangement for that shown in FIG. 6 but in this example the solid surface material is formed as a table top. FIG. 7(a) comprises mould assembly 60 comprising respectively male and female profile parts 61 and 62 having correspondingly formed contours 63 and 64 respectively. When female mould profile part 62 is moved in the direction of arrow 65 until it engages solid surface material 66 whereupon the latter is forced to conform to contour 63. FIG. 7(b) shows the mould arrangement 60 of FIG. 7(a) this time with the solid surface material 66 conforming to the profile of the male mould. Note that the female mould is not shown in FIG. 7(b).

For applications such as bench tops and the like it is preferable that the solid surface veneer be applied to a substrate. For all applications an ideal thickness of solid surface veneer would be in the order of 3.0 mm.

It will be recognised by persons skilled in the art that numerous variations and modifications may be made to the invention without departing from the spirit and scope of the invention broadly described herein.

What is claimed is:

1. A method for forming a curve or curves in a solid surface material and applying the so formed material to a substrate, the method comprising the steps of:

providing a sheet of solid surface material having a thickness within the range of 1.4 to 5.9 mm;

preparing a solid substrate material to receive the sheet of solid surface material;

placing the solid substrate on a forming mold located in or on a forming apparatus including a heating station including heating platens and a vacuuming forming station including a mold and a sealing envelope thereabout;

placing the solid surface material in contact with a heating platen or very near to the platen and heating the platen to a predetermined temperature for a predetermined period so that heat emanating from said platen is distributed substantially uniformly over at least one side of the sheet and throughout the full thickness of the sheet;

after the predetermined heating period has expired relocating the solid surface material onto said solid substrate;

before cooling sandwiching the solid surface material sheet between an upper mold element and said substrate such that the solid surface material sheet conforms to the profile of an opposing surface of the substrate; and forming a solid surface material and substrate composite with the solid surface material sheet and the substrate.

2. A method according to claim 1 comprising the further step of sealing the mold station with said sealing envelope and applying a vacuum to the inside of said sealing envelope such that a free edge or edges of the solid surface material conforms to the profile of a corresponding free edge of the substrate.

3. A method according to claim 2 wherein the heating platen/s contact/s the solid surface material during the heating step.

4. A method according to claim 3 wherein the temperature of the heating platen is set within the range 80° C. to 200° C.

5. A method according to claim 3 wherein the temperature of the heating platen is within the range 165° C. to 185° C.

6. A method according to claim 5 wherein the platen/s is/are heated for a predetermined period commensurate with a temperature selected from said temperature range.

7. A method according to claim 6 wherein the predetermined period fails within the range 5.0 seconds–10 minutes.

8. A method according to claim 7 wherein the dimensions of the solid surface material is within the limits of the periphery of the heating platen.

9. A method according to claim 8 wherein a radiused curve or curves formed in said solid sure material fall within the range 2 mm to 8 mm.

10. A method according to claim 9 wherein the radiused curves formed in the solid surface material are either convex or concave.

11. A method according to claim 10 wherein when the solid surface material is heated by bringing the platen to within 50–60 mm from the opposing surface of the material.

12. A method according to claim 11 wherein for a solid surface material of a plain colour the predetermined temperature is 165° C. and the predetermined period is 1.5 minutes.

13. A method according to claim 11 wherein for a solid surface material of a speckled colour the predetermined temperature is 165° C. and the predetermined period is 2.2 minutes.

14. A method according to claim 4 wherein the platen/s is/are heated for a predetermined period commensurate with a temperature selected from said temperature range.

15. A method for forming a curve or curves in a solid surface material and applying the so formed material to a substrate, the method comprising the steps of:

providing a formed acrylic solid surface material sheet having a thickness within the range of 1.4 to 5.9 mm;

preparing a solid substrate material to receive the sheet of solid surface material;

providing a forming apparatus including a heating station including heating platens and a vacuuming forming station including a mold and a sealing envelope thereabout;

placing the solid surface material in contact with a heating platen or very near to the platen and heating the platen to a predetermined temperature for a predetermined period so that heat emanating from said platen is distributed substantially uniformly over at least one side of the sheet and throughout the full thickness of the sheet;

before cooling sandwiching the solid surface material sheet between an upper mold element and one of another mold part and said substrate such that the solid surface material sheet conforms to the profile of an opposing surface of the substrate or an opposing surface of the another mold part; and forming a solid surface material and substrate composite with the solid surface material sheet and the substrate.

16. A method according to claim 15 wherein after said step of placing the solid surface material in contact with a heating platen after the predetermined heating period has expired relocating the solid surface material onto said solid substrate.

\* \* \* \* \*